(12) United States Patent
Zhao et al.

(10) Patent No.: US 11,378,780 B2
(45) Date of Patent: Jul. 5, 2022

(54) DRIVING DEVICE, CAMERA DEVICE AND ELECTRONIC APPARATUS

(71) Applicant: New Shicoh Motor Co., LTD, Zhejiang (CN)

(72) Inventors: Lu Zhao, Zhejiang (CN); Juhe Zhou, Zhejiang (CN)

(73) Assignee: New Shicoh Motor Co., LTD, Zhejiang (CN)

( * ) Notice: Subject to any disclaimer, the term of this patent is extended or adjusted under 35 U.S.C. 154(b) by 267 days.

(21) Appl. No.: 16/826,806

(22) Filed: Mar. 23, 2020

(65) Prior Publication Data

US 2020/0301109 A1 Sep. 24, 2020

(30) Foreign Application Priority Data

Mar. 20, 2019 (CN) .......................... 201910213617.4

(51) Int. Cl.
*G02B 13/00* (2006.01)
*G02B 7/02* (2021.01)
*G03B 17/02* (2021.01)

(52) U.S. Cl.
CPC ........... *G02B 13/0015* (2013.01); *G02B 7/02* (2013.01); *G03B 17/02* (2013.01)

(58) Field of Classification Search
CPC ........ G02B 13/0015; G02B 7/02; G02B 7/08; G03B 17/02; G03B 30/00; H04N 5/2253; H04N 5/2254
See application file for complete search history.

(56) References Cited

U.S. PATENT DOCUMENTS

| 7,422,482 B2 * | 9/2008 | Wang ................. H01R 13/6594 439/71 |
| 7,699,619 B2 * | 4/2010 | Mizumura ......... H01R 13/6582 439/71 |
| 2006/0051986 A1 * | 3/2006 | Asai .................... H01R 13/2442 439/71 |
| 2008/0192124 A1 * | 8/2008 | Nagasaki ............. H04N 5/2257 348/E5.04 |
| 2018/0213131 A1 * | 7/2018 | Liu ...................... H04N 5/2254 |

FOREIGN PATENT DOCUMENTS

| JP | 200679871 A | | 3/2006 | |
| JP | 2006079871 A | * | 3/2006 | ......... H01R 13/2442 |
| JP | 2008197313 A | | 8/2008 | |

OTHER PUBLICATIONS

Office Action dated Mar. 25, 2021, received in Japanese Patent Application No. P20-046779, English Translation, 4 pages.

* cited by examiner

*Primary Examiner* — Amy R Hsu
(74) *Attorney, Agent, or Firm* — Hayes Soloway P.C.

(57) ABSTRACT

In an embodiment, a driving device includes a housing and a base. The housing has an axial direction and is polygonal in outer shape. The housing includes an outer peripheral side wall and a top wall connected to the front side of the outer peripheral side wall. The top wall is provided with an opening to allow light to pass through. The housing includes a step portion at each corner portion thereof, and the step portion includes a step horizontal wall extending in a direction intersecting with the axial direction. The base has a protruding table that protrudes forward from the front side. The table surface of the protruding table is stuck to a rear side surface of the step horizontal wall.

9 Claims, 5 Drawing Sheets

DRIVING DEVICE, CAMERA DEVICE AND ELECTRONIC APPARATUS

CROSS-REFERENCE TO RELATED APPLICATION

This application claims the benefit of Chinese patent application CN201910213617.4 filed on Mar. 20, 2019, the contents of which are incorporated by reference herein.

TECHNICAL FIELD

The present disclosure relates to a driving device, camera device and electronic apparatus.

BACKGROUND

In the camera device of an electronic apparatus, the driving device drives the lens to move in the camera device through the interaction between the magnetic field generated by energizing the coil thereof and the magnetic field generated by the magnet, so as to achieve the purpose of focusing.

At present, the housing of the driving device on the market is adhered and fixed to the base, and the connection surface between the housing and the base is located on the side wall of the base and the side wall of the housing for adhering.

However, as for the conventional driving device, the area of the connecting surface between the housing and the base of the driving device is small, and the connection strength may be not enough.

SUMMARY

An object of the present disclosure is to provide a driving device in which the connection strength between the housing and the base is high, and to provide a camera device and an electronic apparatus.

In accordance with a first aspect of the present disclosure, there is provided a driving device including a housing and a base. The housing has an axial direction and is polygonal in outer shape. The housing includes an outer peripheral side wall and a top wall connected to the front side of the outer peripheral side wall. The top wall is provided with an opening to allow light to pass through.

The housing includes a step portion at each corner portion thereof, and the step portion includes a step horizontal wall extending in a direction intersecting with the axial direction.

The base has a protruding table that protrudes forward from the front side.

The table surface of the protruding table is stuck to a rear side surface of the step horizontal wall.

In accordance with a second aspect of the present disclosure, there is provided a camera device including the driving device as described above.

In accordance with a third aspect of the present disclosure, there is provided an electronic device including the camera device as described above.

BRIEF DESCRIPTION OF THE DRAWINGS

The above and other features, properties and advantages of the present disclosure will become more apparent from the following description in conjunction with the accompanying drawings and Examples.

DETAILED DESCRIPTION

Figure 1:
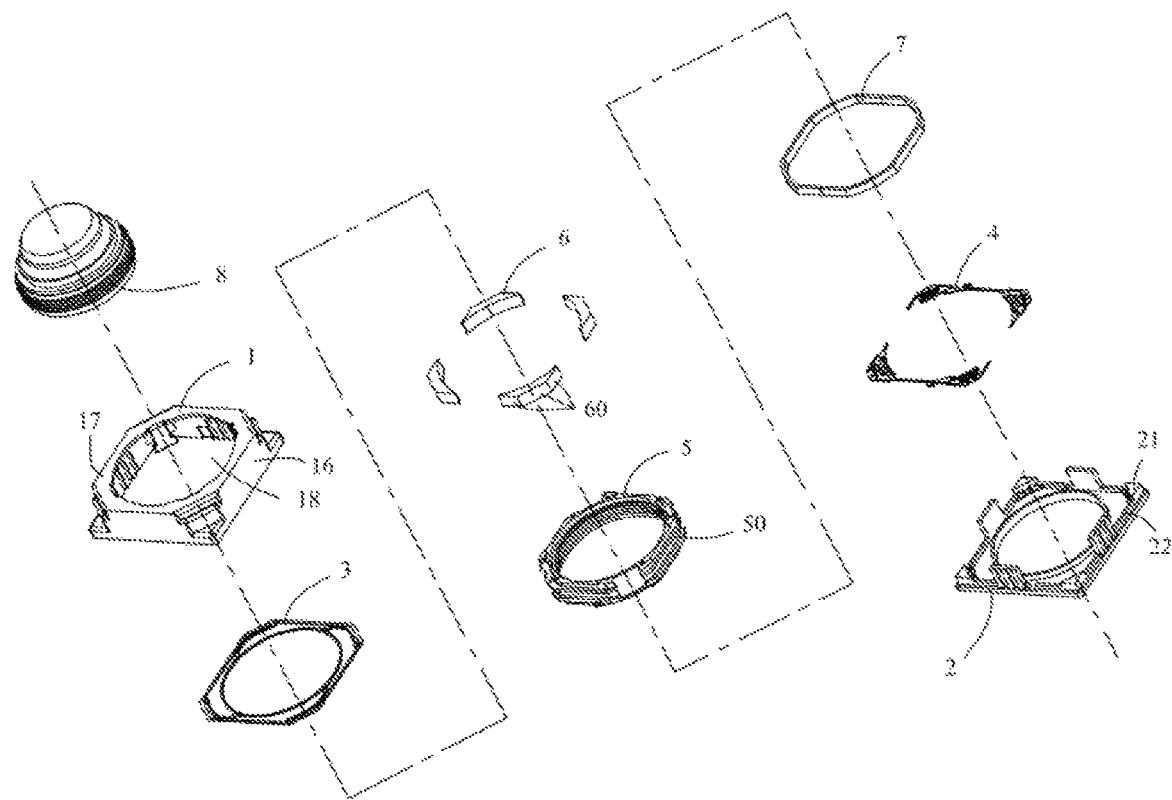
FIG. 1 shows an exploded schematic view of a driving device according to an embodiment.

In the following description, various embodiments or Examples for implementing the subject technical solutions are disclosed. The specific examples of the components and the arrangements are described below for the purpose of simplifying the disclosure, and of course, these are merely examples, and are not intended to limit the protection scope of the present application. For example, the specification may include an embodiment in which a first feature is formed above or on the second feature, and may include an embodiment in which the first and second features are formed by direct contact, and may also include an embodiment in which an additional feature is formed between the first feature and the second feature, so that the first feature and second feature may not be directly related. Additionally, reference numerals and/or letters may be repeated in different examples in these disclosures. This repetition is for the sake of brevity and clarity, and does not by itself represent the relationship between the various embodiments and/or structures to be discussed. Further, when the first element is described to be connected or in combination with the second element, the description includes embodiments in which the first and second elements are directly connected or combined with each other, and also includes the use of one or more other intervening elements to indirectly connect or join the first and second elements to each other.

It should be noted that in the case of use, the "up", "down", "left", "right", "front", "rear", "top", "bottom", "positive", "reverse", "clockwise" and "counterclockwise" in the following description are only used for convenience and do not imply any specific fixed direction. In fact, they are used to reflect the relative position and/or direction between various portions of the object.

The driving device of the present embodiment is disposed in the camera device and is used for driving the lens to move along the optical axis, thereby playing a role of focusing. FIG. 1 shows an exploded schematic view of a driving device according to an embodiment of the present disclosure. The driving device includes a housing 1 and a base 2 provided on the rear side of the housing 1 for supporting the housing 1. A front side spring 3, a rear side spring 4, a lens support 5, a magnet 6 and a coil 7 are respectively disposed in the housing 1. The dashed line shown in FIG. 1 indicates the optical axis of the lens 8 and passes through the center of the lens 8 and corresponds to the axis of the driving device and the axis of the housing 1. In the present embodiment, the object side in the optical axis direction of the lens 8 is the front side, and the opposite side is the rear side.

Figure 2:
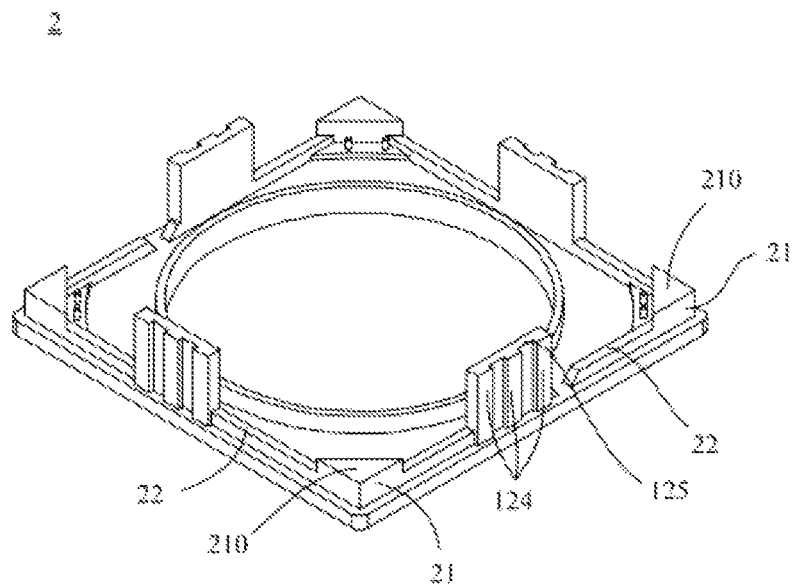
FIG. 2 is a schematic perspective view of a base in the driving device.
Figure 3:
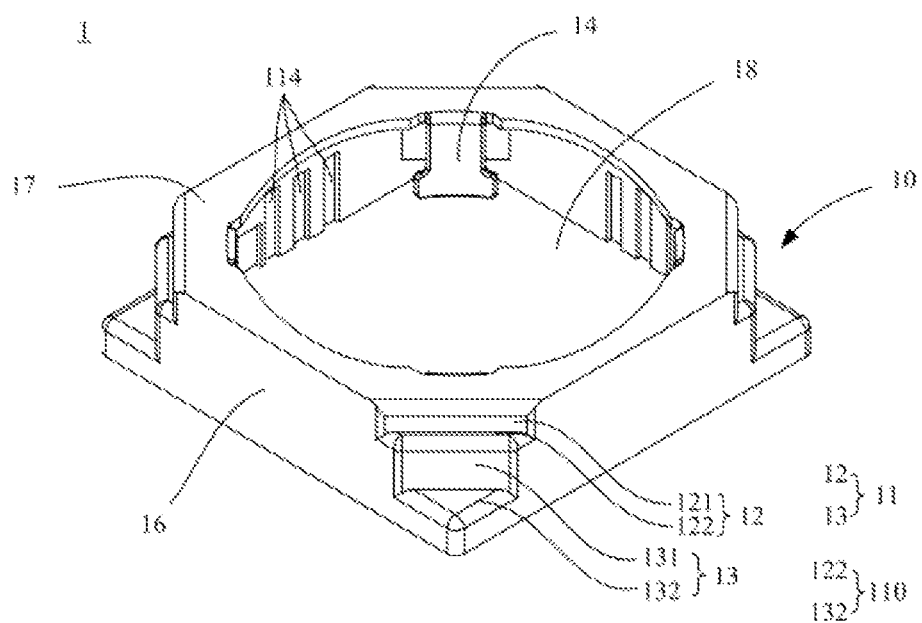
FIG. 3 is a schematic perspective view of the housing in the driving device in one direction.
Figure 4:
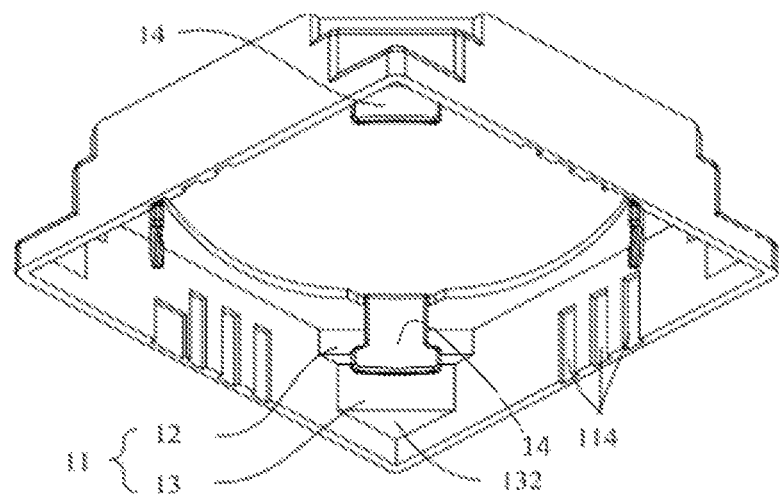
FIG. 4 is a schematic perspective view of the housing in the driving device in another direction.

FIG. 2 is a schematic perspective view of a base 2 in the driving device. FIG. 3 is a schematic perspective view of the housing 1 in the driving device when viewed from the front side direction. FIG. 4 is a schematic perspective view of the housing 1 in the driving device when viewed from the rear side direction. Referring to FIG. 2 to FIG. 4 in combination, the housing 1 of the driving device is made of magnetically conductive material, has a polygonal shape and has an axial direction along the optical axis of the driving device. In the present embodiment, it has a square shape. The housing 1 includes an outer peripheral side wall 16 and a top wall 17 connected to the front side of the outer peripheral side wall 16. The top wall 17 is provided with an opening 18 for allowing light to pass through in the camera, and the lens 8 protrudes from the opening 18 when assembled.

Each corner portion 10 of the housing 1 includes a step portion 11 recessed downward in the thickness direction of the housing 1 and formed in a stepped shape. The step portion 11 includes a step horizontal wall 110 extending in a direction intersecting with the axial line of the housing 1.

Continue to refer to FIG. 2. The base 2 has a quadrangular shape corresponding to the quadrangular housing 1, and includes protruding tables 21 that protrude from four corners of the base 2 toward the front side thereof, and further includes convex ribs 22 provided substantially around the periphery of the base 2. The front surface of the protruding table 21 has a table surface 210. In the assembled state, the housing 1 is connected to the base 2. At this time, the table surface 210 of the protruding table 21 is adhered to the rear side surface of the step horizontal wall 110 (that is, the surface opposite the table surface), and the convex ribs 22 are in contact with the outer peripheral side wall 16 of the housing 1.

Figure 5:
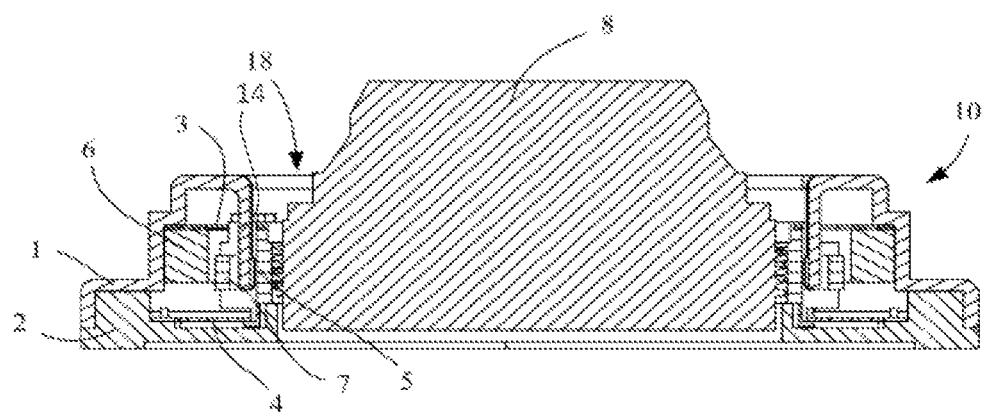
FIG. 5 is a schematic cross-sectional view of the driving device.

FIG. 5 is a schematic cross-sectional view of the driving device. Referring to FIG. 5, other components of the driving device are described below. The lens support 5 is disposed within the housing 1 for supporting the lens 8. The front side spring 3 is disposed between the lens support 5 and the housing 1, and the rear side spring 4 is disposed between the lens support 5 and the base 2. The front side spring 3 and the rear side spring 4 elastically support the lens support 5 in the housing 1, while allowing the lens support 5 to move in the optical axis direction (that is, the axial direction of the housing 1) when subjected to an external force. In an embodiment different from that shown in the drawing, the front side spring 3 and the rear side spring 4 are disposed on at least one of the front side and the rear side of the lens support 5, and can also play a role of elastically holding the lens support 5.

The coil 7 is provided by being wound with the axial direction of the housing 1 as a winding axis so as to surround the outer peripheral side of the lens support 5 and generates a magnetic circuit on the outer circumferential surface of the lens support 5 after being energized. The magnet 6 is disposed on the inner peripheral side of the housing 1. As shown in FIG. 3 through FIG. 5, the magnet 6 is absorbed to adhere to the housing 1 through the side surface 60 of the magnet 6 and is opposed to the coil 7 at a predetermined distance. When the coil 7 is energized with a current, the coil 7 generates an Ampere force by the action of an external magnetic field generated by the magnet 6, and drives the lens support and the lens to move in the optical axis direction (that is, the axial direction of the housing 1). It is to be noted that four coils 7 having a winding axis in a direction orthogonal to the optical axis may be fixed to the outer periphery of the lens support 5 and face the magnet 6.

Figure 6:
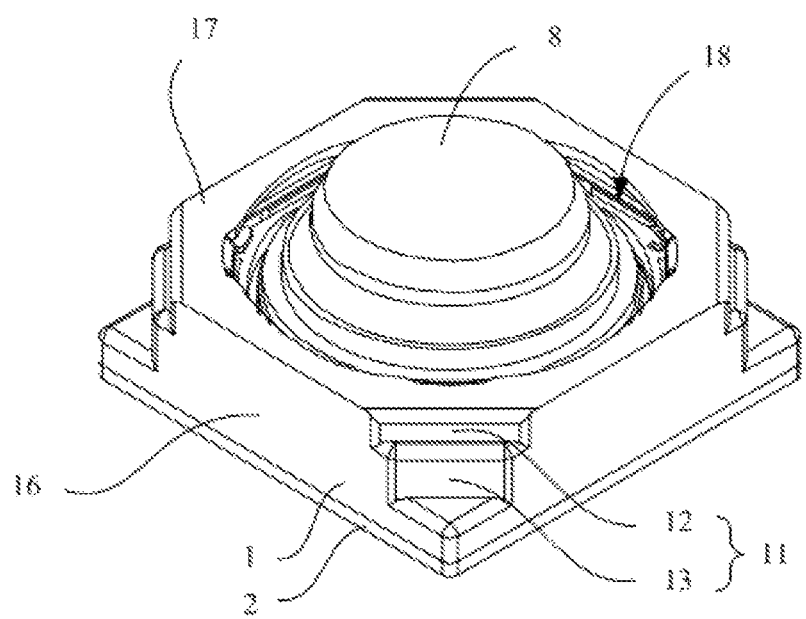
FIG. 6 is a schematic perspective view of the driving device in an assembled state.

FIG. 6 is a schematic perspective view of the driving device in an assembled state. Referring to FIGS. 1 to 6 in combination, it can be seen that in the assembled state, the convex rib 22 on the base 2 in the driving device is in contact with the outer peripheral side wall 16 inside the housing 1, and the table surface 210 of the base protruding table 21 is in contact with the rear side surface of the step horizontal wall 110. At this time, the convex rib 22 is connected to the outer peripheral side wall 16 and the table surface 210 is adhered to the step horizontal wall 110 by such as adhesive, so that the housing 1 is fixed to the base 2.

Compared to the connection between the base and the housing in the conventional driving device which only depends on the adhesion between the convex rib of the base and the side wall of the housing, in driving device of the present embodiment, in association with the housing 1 has increased the contact between the table surface 210 and the step horizontal wall 110 is additionally added, thereby increasing the adhering area between the housing 1 and the base 2, the impact resistance and the peel resistance of the housing 1 of the driving device can thus be improved.

Although one Example of the present embodiment is as described above, in other Examples of the present embodiment, the housing of the driving device may have more details in many aspects compared with the above-mentioned Example, and at least a part of these details may have various variations. At least a part of these details and variations will be described below with some Examples.

Continue to refer to FIG. 2 to FIG. 3. In the present embodiment, the housing 1 is in a polygonal shape, and each corner portion 10 of the housing 1 includes a first step portion 12 and a second step portion 13 that are recessed downward in the thickness direction of the housing 1 several times and formed in a stepped shape at each corner portion 10. The first step portion 12 includes a first step vertical wall 121 extending backward from the outer peripheral side of the top wall 17, and a first step horizontal wall 122 extending from the rear side of the first step vertical wall 121 in a direction intersecting with the axial line of the housing 1.

The second step portion 13 includes a second step vertical wall 131 extending from the first step horizontal wall 122 to the rear side, and a second step horizontal wall 132 extending from the rear side of the second step vertical wall 131 in a direction intersecting with the axial line of the housing 1, so that two step-shaped portions of the first step portion 12 and the second step portion 13 are formed. The inner peripheral wall surface of the second step vertical wall 131 and the inner peripheral wall surface of the outer peripheral side wall 16 adjacent thereto form together a magnet mounting portion for mounting the magnet 6. The rear side surface of the second step horizontal wall 132 (that is, the surface opposite to the table surface) is adhered to the table surface 210 of the protruding table 21. In this embodiment, the magnet 6 is adsorbed to contact and adhere to the inner peripheral wall surface of second step vertical wall 131 and the inner peripheral wall surface of the outer peripheral side wall 16 adjacent thereto via the side surface 60 of the magnet 6. Since the side surface 60 of the magnet 6 is a region with a dense magnetic field, by directly contacting the side surface 60 of the magnet 6 with the housing 1, which is a magnetically conductive material, it is possible to prevent the loss of magnetic field due to the gap between the magnet 60 and the housing 1, and to realize an excellent magnetically conductive action.

Referring to FIG. 3 and FIG. 4 for details, in the present embodiment, the housing 1 further includes an inner peripheral side wall 14. The inner peripheral side wall 14 extends from the edge portion of the opening 18 provided on the inner peripheral side of the top wall 17 toward the rear side. The inner peripheral side wall 14 is configured to correspond to each second step vertical wall 131 and face each other in a direction orthogonal to the axial line of the housing 1. Specifically, the inner peripheral side wall 14 is provided on the outer side of the axis of the housing 1 so as to correspond to each magnet 6 during assembling, and the magnetic field of the magnet 6 makes the region where the inner peripheral side wall 14 is located an effective magnetic field region. As can be seen from FIG. 5, the coil 7 is disposed between the magnet 6 and the inner peripheral side wall 14, and a magnetic loop is formed between the inner peripheral side wall 14 and the side of the magnet 6 opposite the coil. When the coil 7 is energized with a current, the magnetic loop can generate an Ampere force to the energized coil, thereby pushing the coil 7 to move.

As detailed in FIG. 5, in the present embodiment, the front side spring 3 is disposed between the first step horizontal wall 122 of the first step portion 12 and the lens support 5, and the first step horizontal wall 122 is configured to support the front side spring 3.

In the present embodiment, since the front side surface of the magnet 6 is restricted by the rear side surface of the first step horizontal wall 122 of the first step portion 12, the rear side surface of the first step horizontal wall 122 is provided as a positioning surface of the front side of the magnet 6 so as to play a role of positioning the front side of the magnet 6.

In the present embodiment, the housing 1 is a rectangular body. The step portions 11 are disposed at four corner portions 10 of the rectangular body, and correspondingly, the protruding tables 21 are disposed at four corner portions of the base 2. In some other embodiments different from that shown in the figures, the housing 1 may also have other suitable polygonal shapes.

Further, in the present embodiment, engaging grooves 114 are provided on the inner side of the outer peripheral side wall 16 of the housing 1, and correspondingly, engaging members are erected at positions corresponding to the engaging grooves 114 on the base 2. In assembling the driving device, the engaging members 124 are fitted so as to be embedded into the engaging grooves 114, thereby further enhancing the assembly firmness of the housing 1 and the base 2. Optionally, when assembling, an adhesive may also be applied on the contact surfaces of the engaging members 124 and the engaging grooves 114, so that the engaging members 124 adheres to the engaging grooves 114 to further enhance the assembly firmness. Optionally, as shown in FIG. 2, the engaging members 124 may be convex portions provided on the upper blocking wall 125 of the base 2.

Further, as shown in FIG. 1, in the present embodiment, the lens support 5 is provided with a coil engaging groove 50 in the middle of the outer peripheral side thereof, and the coil 7 is fixed on the lens support 5 by being wound to be provided in the coil engaging groove 50.

In one embodiment of the driving device, the driving device is disposed in the camera device and the lens 8 is the lens of the camera device.

In an embodiment of the camera device, the aforementioned camera device is disposed in an electronic device such as a notebook computer or a mobile phone.

Figure 7:
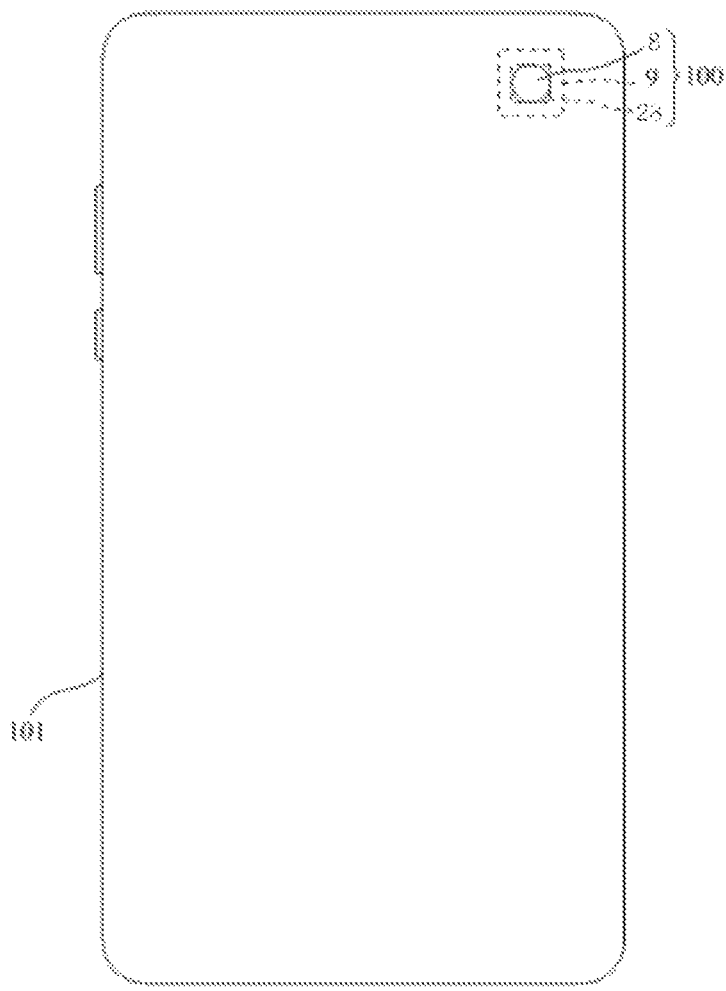
FIG. 7 is a front view of a smartphone mounted with a camera device including a driving device according to an embodiment of the present disclosure.

FIG. 7 shows an embodiment of an electronic apparatus including the camera device described above. The camera device 100 shown in FIG. 7 includes the driving device 9 according to an embodiment of the present disclosure, and is embedded in the case body of the smartphone 101 according to an embodiment of the present disclosure. The camera device 100 includes a lens support 5; an image sensor 8 converting light incident through the lens 8 supported by the lens support 5 into an image signal; and a driving device 9 constituted as described above.

The present disclosure is disclosed in the above preferred embodiments, but is not intended to limit the present disclosure, and any changes and modifications may be made by those skilled in the art without departing from the spirit and scope of the present disclosure. Therefore, any alternations, equivalent changes, and modifications made to the above examples in accordance with the technical essence of the present disclosure without departing from the technical solution of the present disclosure shall fall within the scope of protection defined by the claims of the present disclosure.

What is claimed is:

1. A driving device, comprising a base and a housing with an axial direction, the housing being polygonal in outer shape and comprising an outer peripheral side wall and a top wall connected to a front side of the outer peripheral side wall, the top wall being provided with an opening to allow light to pass therethrough, wherein,
   the housing comprises a step portion at each corner portion thereof, and the step portion comprises:
      a step horizontal wall extending in a direction intersecting with the axial direction;
   the base comprises a protruding table protruding forward from the front side; and
   a table surface of the protruding table is stuck to a rear side surface of the step horizontal wall, wherein
   each of the step portions comprises a first step portion and a second step portion formed in a stepped shape,
   the first step portion comprises:
      a first step vertical wall extending from an outer peripheral side toward a rear side of the top wall, and
      a first step horizontal wall extending from a rear side of the first step vertical wall in a direction intersecting with the axial line;
   the second step portion comprises:
      a second step vertical wall extending from the first step horizontal wall toward a rear side, and
      a second step horizontal wall extending from a rear side of the second step vertical wall in a direction intersecting with the axial line;
      an inner peripheral wall surface of the second step vertical wall and an inner peripheral wall surface of the outer peripheral side wall adjacent thereto form a magnet mounting portion, and
   the rear side surface of the second step horizontal wall is stuck to the table surface of the protruding table.

2. The driving device according to claim 1, wherein, the housing further comprises an inner peripheral side wall at each corner portion thereof,
   the inner peripheral side wall extends from an inner peripheral side toward a rear side of the top wall, and
   the inner peripheral side wall and the second step vertical wall are opposed to each other in a direction orthogonal to the axial line.

3. The driving device according to claim 1, further comprising:
   a magnet disposed at the magnet mounting portion;
   a lens support disposed in the housing;
   a spring supporting the lens support on at least one of a front side and a rear side of the lens support; and
   a coil disposed on an outer peripheral side of the lens support,
   wherein the magnet comprises side surfaces closely contacting the inner peripheral wall surface of the of the second step vertical wall and the inner peripheral wall surface of the outer peripheral side wall adjacent thereto in the magnet mounting portion, respectively.

4. The driving device according to claim 3, wherein the first step horizontal wall is provided with a front side spring supporting the lens support.

5. The driving device according to claim 3, wherein the rear side surface of the first step horizontal wall is provided as a positioning surface on a front side of the magnet.

6. The driving device according to claim 1, wherein the base has a rectangular shape and the protruding tables are provided at four corner portions of the base.

7. The driving device according to claim 1, wherein
engaging grooves are provided in the inner peripheral surface of the outer peripheral side wall of the housing,
engaging members are provided at positions corresponding to the engaging grooves on the base, and
the engaging members are fitted so as to be embedded into the engaging grooves.

8. A camera device comprising the driving device according to claim 1.

9. An electronic device comprising the camera device according to claim 8.

* * * * *